US011736273B2

(12) United States Patent
Yang et al.

(10) Patent No.: US 11,736,273 B2
(45) Date of Patent: *Aug. 22, 2023

(54) ELECTRONIC SUBSCRIBER IDENTITY MODULE TRANSFER CREDENTIAL WRAPPING

(71) Applicant: Apple Inc., Cupertino, CA (US)

(72) Inventors: Xiangying Yang, Cupertino, CA (US); Jean-Marc Padova, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,236

(22) Filed: Aug. 16, 2022

(65) Prior Publication Data

US 2022/0399993 A1    Dec. 15, 2022

Related U.S. Application Data

(63) Continuation of application No. 17/211,749, filed on Mar. 24, 2021, now Pat. No. 11,516,003.

(60) Provisional application No. 63/004,829, filed on Apr. 3, 2020.

(51) Int. Cl.
| | |
|---|---|
| *H04L 29/06* | (2006.01) |
| *G06F 21/00* | (2013.01) |
| *H04L 9/08* | (2006.01) |
| *H04L 9/30* | (2006.01) |
| *H04W 12/72* | (2021.01) |
| *H04W 12/037* | (2021.01) |

(52) U.S. Cl.
CPC .......... *H04L 9/0822* (2013.01); *H04L 9/0894* (2013.01); *H04L 9/3073* (2013.01); *H04W 12/037* (2021.01); *H04W 12/72* (2021.01)

(58) Field of Classification Search
None
See application file for complete search history.

(56) References Cited

U.S. PATENT DOCUMENTS

| | | | | |
|---|---|---|---|---|
| 9,730,072 | B2 * | 8/2017 | Yang | H04L 9/0877 |
| 2008/0065889 | A1 * | 3/2008 | Greco | H04L 9/083 |
| | | | | 713/171 |
| 2009/0028322 | A1 * | 1/2009 | Goodman | G06F 21/80 |
| | | | | 380/2 |

(Continued)

*Primary Examiner* — Lisa C Lewis
(74) *Attorney, Agent, or Firm* — Dickinson Wright RLLP (57) ABSTRACT

Embodiments described herein relate to credential wrapping for secure transfer of electronic SIMs (eSIMs) between wireless devices. Transfer of an eSIM from a source device to a target device includes re-encryption of sensitive eSIM data, e.g., eSIM encryption keys, financial transaction credentials, transit authority credentials, and the like, using new encryption keys that include ephemeral elements applicable to a single, particular transfer session between the source device and the target device. The sensitive eSIM data encrypted with a symmetric key ($K_s$) is re-wrapped with a new header that includes a version of $K_s$ encrypted with a new key encryption key (KEK) and information to derive KEK by the target device. The re-encrypted sensitive SIM data is formatted with additional eSIM data into a new bound profile package (BPP) to transfer the eSIM from the source device to the target device.

20 Claims, 9 Drawing Sheets

(56) References Cited

U.S. PATENT DOCUMENTS

| | | | | |
|---|---|---|---|---|
| 2012/0108205 A1* | 5/2012 | Schell | ............... | H04L 63/0823 |
| | | | | 455/411 |
| 2012/0260090 A1* | 10/2012 | Hauck | ............... | H04W 12/35 |
| | | | | 713/168 |
| 2013/0227646 A1* | 8/2013 | Haggerty | ............ | H04L 63/0853 |
| | | | | 726/3 |
| 2014/0143826 A1* | 5/2014 | Sharp | ............... | G06F 21/604 |
| | | | | 726/1 |
| 2014/0219447 A1* | 8/2014 | Park | ............... | H04W 12/35 |
| | | | | 380/247 |
| 2015/0341791 A1* | 11/2015 | Yang | ............... | G06F 21/33 |
| | | | | 713/159 |
| 2017/0093565 A1* | 3/2017 | Yang | ............... | H04W 12/06 |
| 2017/0280328 A1* | 9/2017 | Yang | ............... | H04W 12/35 |
| 2017/0338954 A1* | 11/2017 | Yang | ............... | H04W 12/35 |
| 2019/0074983 A1* | 3/2019 | Yang | ............... | H04L 9/3265 |
| 2021/0314148 A1 | 10/2021 | Yang et al. | | |

* cited by examiner

ELECTRONIC SUBSCRIBER IDENTITY MODULE TRANSFER CREDENTIAL WRAPPING

CROSS-REFERENCE TO RELATED APPLICATIONS

The present application is a continuation of U.S. application Ser. No. 17/211,749, entitled "ELECTRONIC SUBSCRIBER IDENTITY MODULE TRANSFER CREDENTIAL WRAPPING," filed Mar. 24, 2021, issued Nov. 29, 2022 as U.S. Pat. No. 11,516,003, which claims the benefit of U.S. Provisional Application No. 63/004,829, entitled "ELECTRONIC SUBSCRIBER IDENTITY MODULE TRANSFER CREDENTIAL WRAPPING," filed Apr. 3, 2020, the contents of all of which are incorporated by reference herein in their entirety for all purposes.

FIELD

The described embodiments relate to wireless communications, including methods and apparatus to support credential wrapping for secure transfer of electronic SIMs (eSIMs) between wireless devices.

BACKGROUND

Newer generation, e.g., fourth generation (4G) and fifth generation (5G), cellular wireless networks that implement one or more $3^{rd}$ Generation Partnership Project (3GPP) Long Term Evolution (LTE), LTE Advanced (LTE-A), and 5G standards are rapidly being developed and deployed by network operators worldwide. The newer cellular wireless networks provide a range of packet-based services. A user of a wireless device can access services offered by a wireless network service provider, also referred to as a mobile network operator (MNO), based on service subscriptions controlled by authentication credentials included in a profile, also referred to as a subscriber identity module (SIM), when included in a removable universal integrated circuit card (UICC), also referred to as a SIM card, or as an electronic SIM (eSIM), when included in an embedded UICC (eUICC) of the wireless device. With a removable UICC and an unlocked wireless device, a user can access different services by replacing the UICC/SIM combination, e.g., by transferring the SIM card from one wireless device to another wireless device. Transfer of the credentials of the SIM card is secure, as the sensitive data remains contained in the secure element of the SIM card. With a configurable eUICC, eSIMs can be downloaded to the eUICC for access to different wireless services. The eSIMs are decrypted and written by an eUICC operating system (OS) into dedicated security domains (protected processing environments) within the eUICC. The eSIM credentials, securely stored in the dedicated security domains, are difficult to access without breaking eUICC security countermeasures. Protection of installed credentials to ensure tamper resistance is a requirement of various eSIM standards. A user can seek to transfer one or more eSIMs between wireless devices, such as when changing between different wireless devices or when purchasing and configuring a new wireless device to replace an older wireless device. There exists a need for mechanisms to ensure secure transfer of one or more eSIMs between wireless devices.

SUMMARY

This application describes various embodiments that relate to wireless communications, including methods and apparatus to support credential wrapping for secure transfer of electronic SIMs (eSIMs) between wireless devices. Transfer of one or more eSIMs can occur between two devices that are within proximity of each other, e.g., where the devices can connect securely via a local connection, such as via a wireless personal area network (WPAN) connection, via a wireless local area network (WLAN) connection, via a peer-to-peer connection, or the like. Transfer of eSIMs can also occur via an online network-based service, such as via an MNO-managed service or via a third-party service, where the devices need not be in proximity to each other. Transfer of an eSIM from a source device to a target device can be preceded or accompanied by re-encryption of sensitive eSIM data, e.g., eSIM encryption keys, financial transaction credentials, transit authority credentials, and the like, using new encryption keys that include ephemeral elements applicable to a single, particular transfer session between the source device and the target device. The re-encrypted sensitive SIM data can be formatted with additional eSIM data into a new bound profile package (BPP) to transfer the eSIM from the source device to the target device. In some embodiments, eSIM data, as encrypted originally by a network-based provisioning server with a symmetric key ($K_s$) can be re-wrapped with a new header that includes a version of $K_s$ encrypted with a new key encryption key (KEK) and information to derive KEK by the target device. The new BPP can then be transferred from the eUICC of the source device to the eUICC of the target device for decryption and installation. In some embodiments, a BPP received from the provisioning server by the eUICC of the source device can include eSIM data divided into an eSIM profile in a standards-based readable format and a separate encrypted data block that includes sensitive eSIM data. The eUICC of the source device can re-wrap the eSIM profile and encrypted data with a new header including a newly encrypted $K_s$ (using a new KEK) to form a new BPP to transfer to the eUICC of the target device. In some embodiments, the eSIM profile standards-based format portion is constructed by the eUICC of the source device from an installed eSIM profile, which can include OTA updates and/or user customization that occurred after initial installation. In some embodiments, the new BPP includes multiple data portions that each include separate sensitive data in encrypted format for transfer to the eUICC of the target device. In some embodiments, the one or more of the multiple data portions include updated sensitive data for transfer to the eUICC of the target device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

These and other embodiments are discussed below with reference to FIGS. 1 through 9; however, those skilled in the art will readily appreciate that the detailed description given herein with respect to these figures is for explanatory purposes only and should not be construed as limiting.

Figure 1:
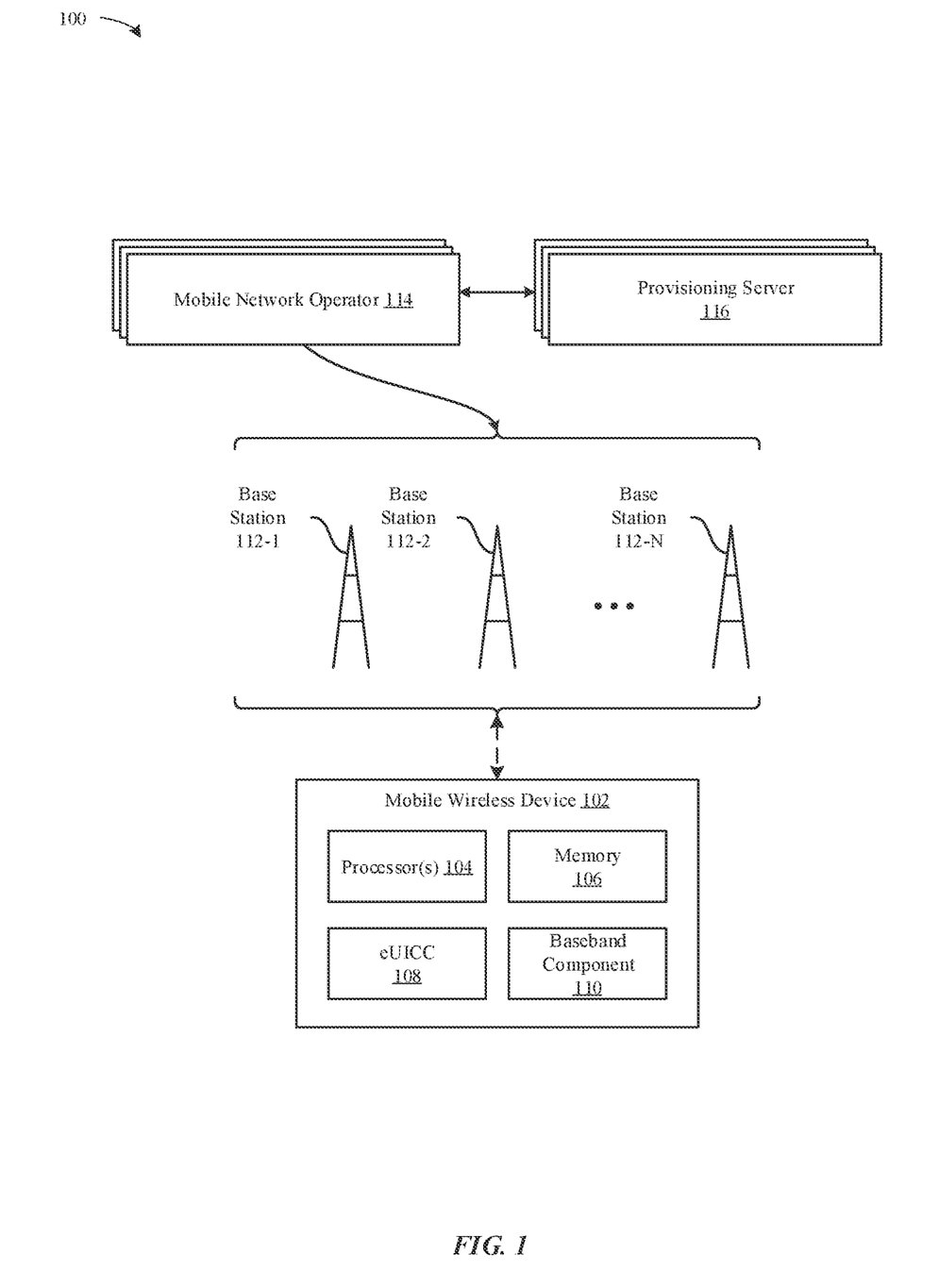
FIG. 1 illustrates a block diagram of different components of an exemplary system configured to implement eSIM transfer with credential wrapping, according to some embodiments.

FIG. 1 illustrates a block diagram of different components of a system 100 that includes i) a mobile wireless device 102, which can also be referred to as a wireless device, a mobile wireless device, a mobile device, a user equipment (UE), a device, and the like, ii) a group of base stations 112-1 to 112-N that are managed by different Mobile Network Operators (MNOs) 114, and iii) a set of provisioning servers 116 that are in communication with the MNOs 114. The mobile wireless device 102 can represent a mobile computing device (e.g., an iPhone®, an iPad®, or an Apple Watch® by Apple®), the base stations 112-1 to 112-N can represent cellular wireless network entities including evolved NodeBs (eNodeBs or eNBs) and/or next generation NodeBs (gNodeBs or gNBs) that are configured to communicate with the mobile wireless device 102, and the MNOs 114 can represent different wireless service providers that provide specific services (e.g., voice and data) to which the mobile wireless device 102 can subscribe. The mobile wireless device 102 can include processing circuitry, which can include one or more processors 104 and a memory 106, an embedded Universal Integrated Circuit Card (eUICC) 108, and a baseband component 110. In some embodiments, the mobile wireless device 102 includes one or more physical UICCs, also referred to as Subscriber Identity Module (SIM) cards (not shown), in addition to the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing services offered by one or more different MNOs 114 via communication through base stations 112-1 to 112-N. To be able to access services provided by the MNOs, an eSIM can be provisioned to the eUICC 108 of the mobile wireless device 102. In some embodiments, the eUICC 108 obtains one or more eSIMs (or updates for one or more eSIMs) from one or more associated provisioning servers 116. It is noted that provisioning servers 116 can be maintained by a manufacturer of the mobile wireless device 102, the MNOs 114, third party entities, and the like. Communication of eSIM data between a provisioning server 116 and the eUICC 108 (or between the provisioning server 116 and processing circuitry of the mobile wireless device 102 external to the eUICC 108, e.g., the processor 104) can use a secure communication channel, and the provisioning server 116 can seek to ensure that the eUICC 108 of the mobile wireless device 102 is compatible with an eSIM to be downloaded to the mobile wireless device 102. Additionally, MNOs 114 can require that all or portions of an eSIM be securely stored in dedicated security domains on the eUICC 108 to protect against tampering and/or cloning of sensitive eSIM data.

Figure 2:
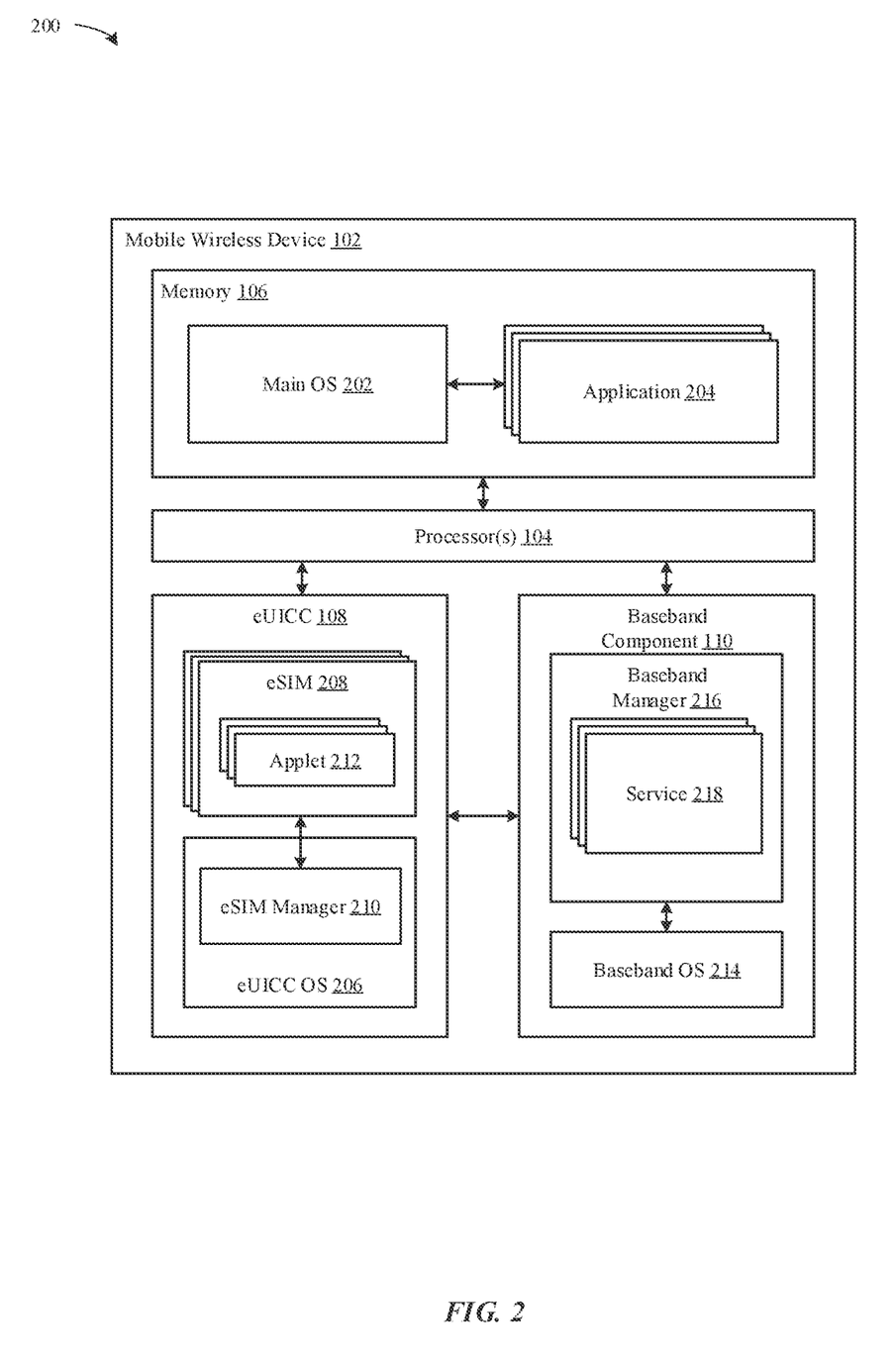
FIG. 2 illustrates a block diagram of a more detailed view of exemplary components of the system of FIG. 1, according to some embodiments.

FIG. 2 illustrates a block diagram 200 of a more detailed view of exemplary components of the system 100 of FIG. 1. The one or more processors 104, in conjunction with the memory 106, can implement a main operating system (OS) 202 that is configured to execute applications 204 (e.g., native OS applications and user applications). The eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, or otherwise performing management of the eSIMs 208 within the eUICC 108 and providing the baseband component 110 with access to the eSIMs 208 to provide access to wireless services for the mobile wireless device 102. The eUICC OS 206 can include an eSIM manager 210, which can perform management functions for various eSIMs 208. Each eSIM 208 can include a number of applets 212 that define the manner in which the eSIM 208 operates. For example, one or more of the applets 212, when implemented by the baseband component 110 and the eUICC 108, can be configured to enable the mobile wireless device 102 to communicate with an MNO 114 and provide useful features (e.g., phone calls and internet) to a user of the mobile wireless device 102.

A baseband component 110 of the mobile wireless device 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3:
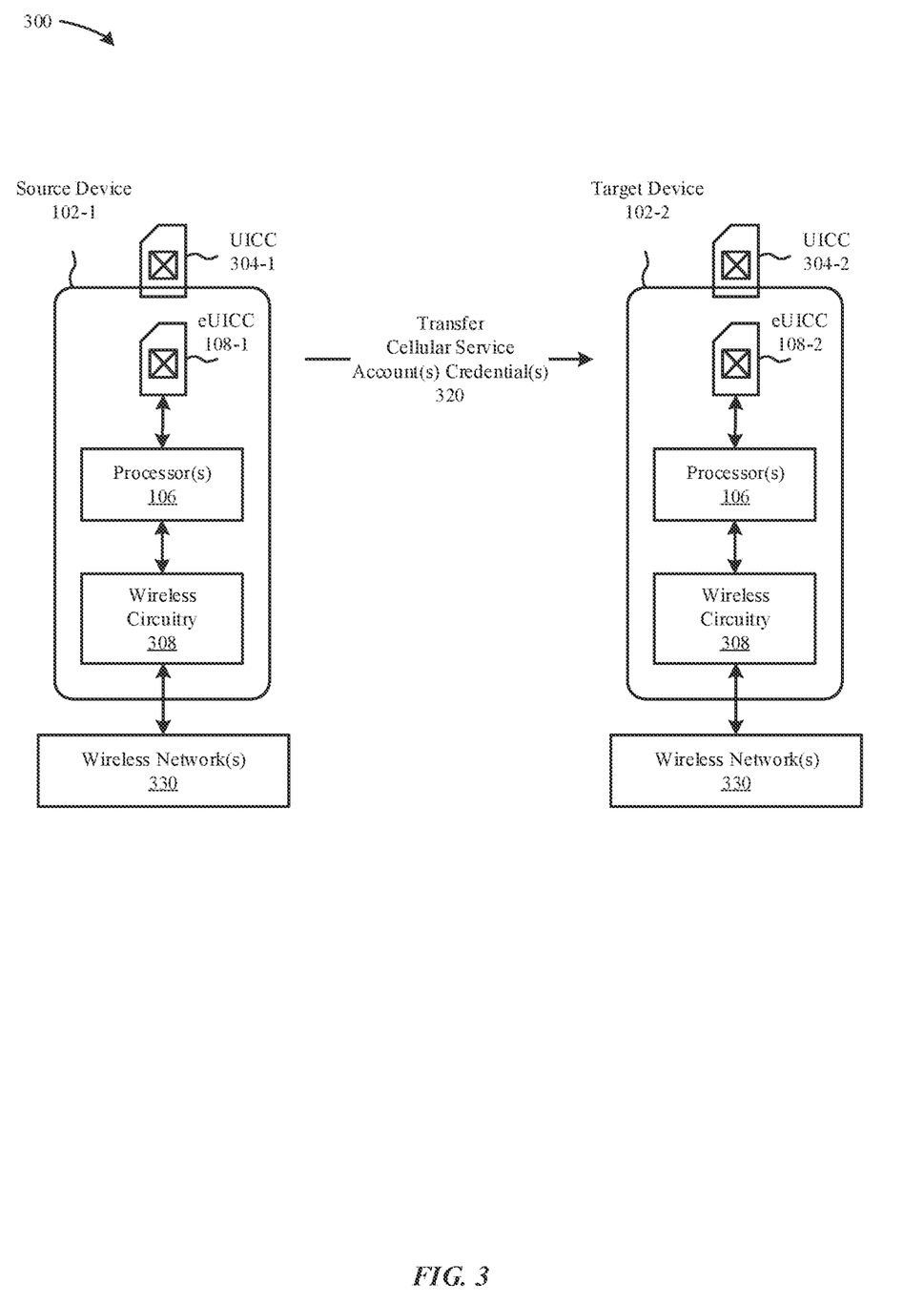
FIG. 3 illustrates a diagram of an exemplary transfer of cellular service account credentials for access to cellular services from a source device to a target device, according to some embodiments.

FIG. 3 illustrates a diagram 300 of an exemplary transfer 320 of cellular service account credentials for access to cellular services from a source device 102-1 to a target device 102-2. The source device 102-1 and the target device 102-2 may be within proximity of each other to establish a direct secure connection between them or may be separated by a distance where transfer occurs via an indirect connection, such as over a wireless local area network (WLAN) and/or via one or more cellular wireless networks 330. Transfer of credentials that permit access to services of cellular wireless networks 330 can also be referred to as transfer of one or more virtual credentials, such as one or more eSIMs 208, also referred to as profiles or plans, from the source device 102-1 to the target device 102-2. The eSIMs 208 may be initially present on the eUICC 108-1 of the source device 102-1, and a user may seek to transfer one or more of the eSIMs 208 from the source device 102-1 to the eUICC 108-2 of the target device 102-2. The eSIMs 208 may be associated with one or more cellular service accounts for one or more cellular service providers, also referred to as mobile network operators (MNOs). Transfer of one or more eSIMs 208 can occur without transferring a UICC 304-1 of the source device 102-1 or replacement of a UICC 304-2 of the target device 1-202. As illustrated, the source device 102-1 and the target device 102-2 can each include one or more processors 104 and wireless circuitry 308 that can be used to communicate with one or more wireless networks 330. The eSIMs 208 that are transferred can allow the target device 102-2 to access cellular services for one or more cellular wireless networks that previously were accessible by the source device 102-1.

Figure 4:
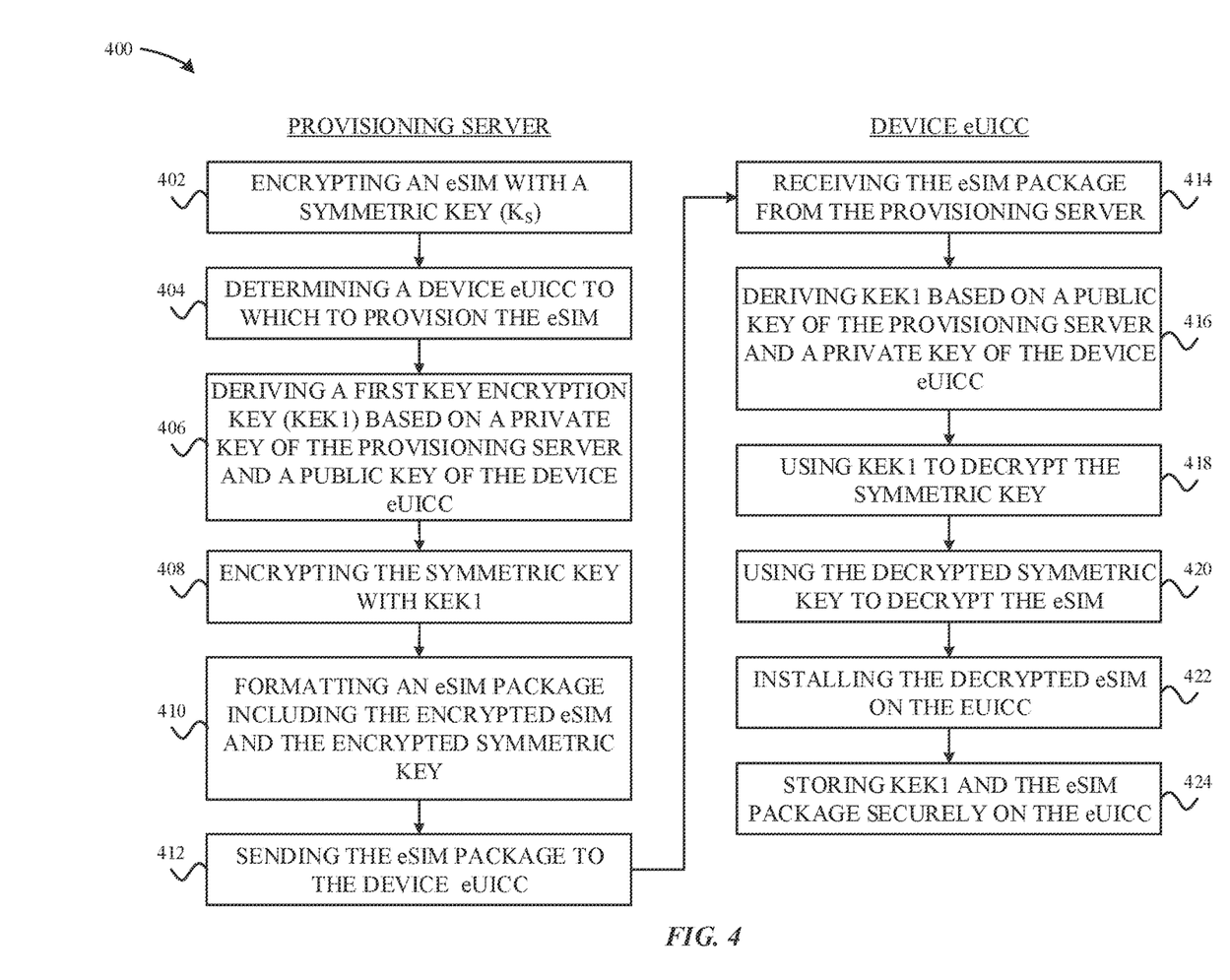
FIG. 4 illustrates a flow chart of an exemplary transfer of an eSIM from a network-based provisioning server to a device eUICC, according to some embodiments.

FIG. 4 illustrates a flow chart 400 of an exemplary transfer of an eSIM 208 from a network-based provisioning server 116 to an eUICC 108 of a mobile wireless device 102. At 402, the provisioning server 116 encrypts an eSIM 208 with a symmetric key ($K_s$). Encryption of the eSIM 208 can be performed by the provisioning server 116 without knowledge of the mobile wireless device 102 or an eUICC 108 thereon to which the eSIM 208 can later be downloaded. This allows for encryption of the eSIM 208 to occur off-line and reduces time for later download of an eSIM 208 to the eUICC 108 of the mobile wireless device 102. At 404, the provisioning server 116 can determine the eUICC 108 of the mobile wireless device 102 to which to provision the eSIM 208. At 406, the provisioning server 116 can derive a first key encryption key (KEK1) based on a private key of the provisioning server 116 ($SK_{server}$) and a public key of the eUICC 108 of the mobile wireless device 102 ($PK_{eUICC}$). For example KEK1 can be derived based on a key derivation function (KDF) using an Elliptic-Curve Diffie-Hellman (ECDH) key-agreement protocol, KEK1=KDF(ECDH($PK_{eUICC}$, $SK_{server}$)). In some embodiments, the public and/or private keys are ephemeral keys, e.g., $ePK_{eUICC}$, $eSK_{server}$, applicable to a provisioning session for downloading the eSIM 208 from the provisioning server 116 to the eUICC 108 of the mobile wireless device 102. At 408, the provisioning server 116 encrypts the symmetric key $K_s$ with the generated key encryption key KEK1. At 410, the provisioning server 116 formats an eSIM bound profile package (BPP) that includes the previously $K_s$ encrypted eSIM 208 and the KEK1 encrypted symmetric key $K_s$. In some embodiments, the KEK1 encrypted symmetric key $K_s$ is combined with information for deriving KEK1 in a header that combines with the $K_s$ encrypted eSIM 208 to form the BPP. At 412, the provisioning server 116 sends the BPP to the eUICC 108 of the mobile wireless device 102. At 414, the eUICC 108 of the mobile wireless device 102 receives the BPP from the provisioning server 116. At 416, the eUICC 108 of the mobile wireless device 102 derives KEK1, e.g., based on the ECDH KDF using a public key of the provisioning server 116 ($PK_{server}$) that corresponds to $SK_{server}$ and a private key of the eUICC ($SK_{eUICC}$) that corresponds to $PK_{eUICC}$. For example, the eUICC 108 derives KEK1=KDF(EDCH($PK_{server}$, $SK_{eUICC}$)). At 418, the eUICC 108 of the mobile wireless device 102 uses KEK1 to decrypt $K_s$, and subsequently at 420, the eUICC 108 uses the decrypted $K_s$ to decrypt the eSIM 208. At 422, the eUICC 108 installs the decrypted eSIM data on the eUICC 108. At 424, in some embodiments, all or portions of the BPP, e.g., sensitive eSIM data, are installed in one or more dedicated security domains within the eUICC 108, e.g., within a profile issuer security domain (ISD-P) for the MNO associated with the eSIM 208, and are inaccessible to the eUICC OS 206 of the eUICC 108 to protect the sensitive eSIM data from tampering. In some embodiments, less sensitive eSIM data and/or encrypted sensitive eSIM data are stored in a security domain associated with the eUICC OS 206, e.g., within a root issuer security domain (ISD-R), and are accessible to the eUICC OS 206 of the eUICC 108. In some embodiments, KEK1 is stored securely on the eUICC 108, e.g., within an ISD-P. In some embodiments, the BPP or portions thereof are stored securely on the eUICC 108, e.g., within an ISD-P.

Figure 5:
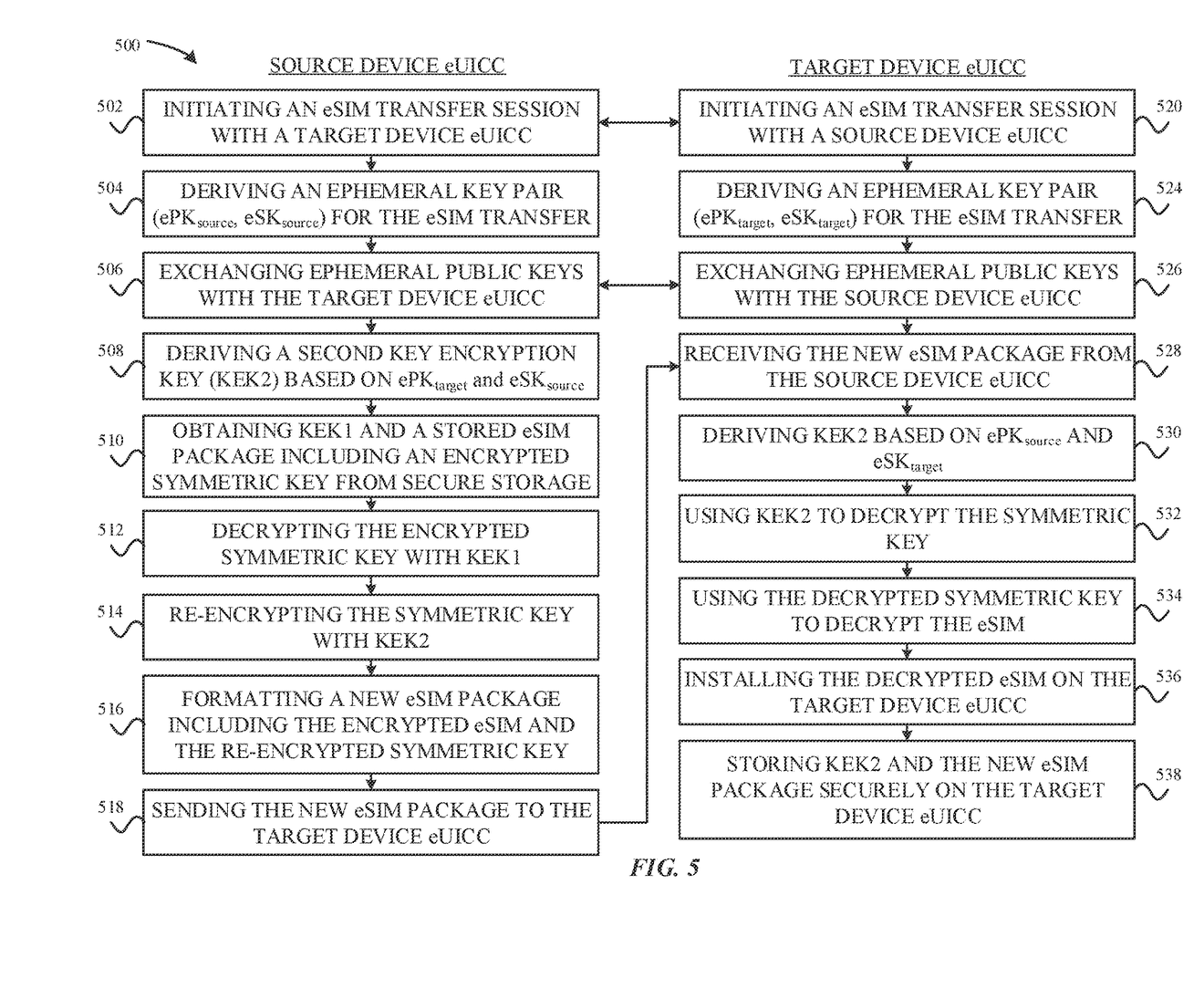
FIG. 5 illustrates a flow chart of an exemplary transfer of an eSIM with credential rewrapping from a source device eUICC to a target device eUICC, according to some embodiments.

FIG. 5 illustrates a flow chart 500 of an exemplary transfer of an eSIM 208 with credential rewrapping from an eUICC 108-1 of a source device 102-1 to an eUICC 108-2 of a target device 102-2. At 502/520, the source device eUICC 108-1 or the target device eUICC 108-2 initiates an eSIM transfer session for secure transfer of an eSIM 208 (or multiple eSIMs 208) from the source device eUICC 108-1 to the target device eUICC 108-2. At 504, the source device eUICC 108-1 derives an ephemeral key pair ($ePK_{source}$, $eSK_{source}$) to use for secure transfer of the eSIM(s) 208 during the eSIM transfer session. Similarly, at 524, the target device eUICC 108-2 derives an ephemeral key pair ($ePK_{target}$, $eSK_{target}$) to use for secure transfer of the eSIM(s) 208 during the eSIM transfer session. At 506, the source device eUICC 108-1 provides the ephemeral public key $ePK_{source}$ to the target device eUICC 108-2, while at 526, the target device eUICC 108-2 provides the ephemeral public key $ePK_{target}$ to the source device eUICC 108-1. After exchanging ephemeral public keys with the target device eUICC 108-2, the source device eUICC 108-1, at 508, derives a second key encryption key (KEK2) with which to encrypt a symmetric key $K_s$ for transfer of the eSIM 208 to the target device eUICC 108-2. For example, KEK2 can be generated by the source device eUICC 108-1 using an ECDH KDF and the ephemeral keys, such as KEK2=KDF (EDCH(ePK$_{target}$, eSK$_{source}$)). At 510, the source device eUICC 108-1 obtains a first key encryption key (KEK1) and a stored eSIM BPP that includes a symmetric key $K_s$ encrypted with KEK1. The stored eSIM BPP also includes eSIM data encrypted with $K_s$. KEK1 and the eSIM BPP can have been previously stored securely on the source device eUICC 108-1, e.g., in an ISD-P for an MNO associated with the eSIM 208 to be transferred. At 512, the source device eUICC 108-1 decrypts the encrypted symmetric key $K_s$ using the first key encryption key KEK1, and at 514, the source device eUICC 108-1 re-encrypts the decrypted symmetric key $K_s$ with the second key encryption key KEK2. At 516, the source device eUICC 108-1 formats a new eSIM BPP including the eSIM data (encrypted with $K_s$) with the re-encrypted symmetric key $K_s$ (encrypted with KEK2). At 518, the source device eUICC 108-1 sends the new eSIM BPP to the target device eUICC 108-2, which receives the new eSIM BPP at 528. At 530, the target device eUICC 108-2 derives the second key encryption key KEK2 using an ECDH KDF and the ephemeral keys, e.g., KEK2=KDF (EDCH(ePK$_{source}$, eSK$_{target}$)). At 532, the target device eUICC 108-2 uses KEK2 to decrypt the symmetric key $K_s$, and subsequently, at 534, the target device eUICC 108-2 uses $K_s$ to decrypt the eSIM. At 536, the target device eUICC 108-2 installs the decrypted eSIM in a dedicated security domain, e.g., in an ISD-P, on the target device eUICC 108-2. At 538, the target device eUICC 108-2 securely stores the second key encryption key KEK2 and the received eSIM package on the target device eUICC 108-2. The stored KEK2 and eSIM package can be later used to transfer the eSIM to an eUICC 108 of another mobile wireless device 102.

Figure 6:
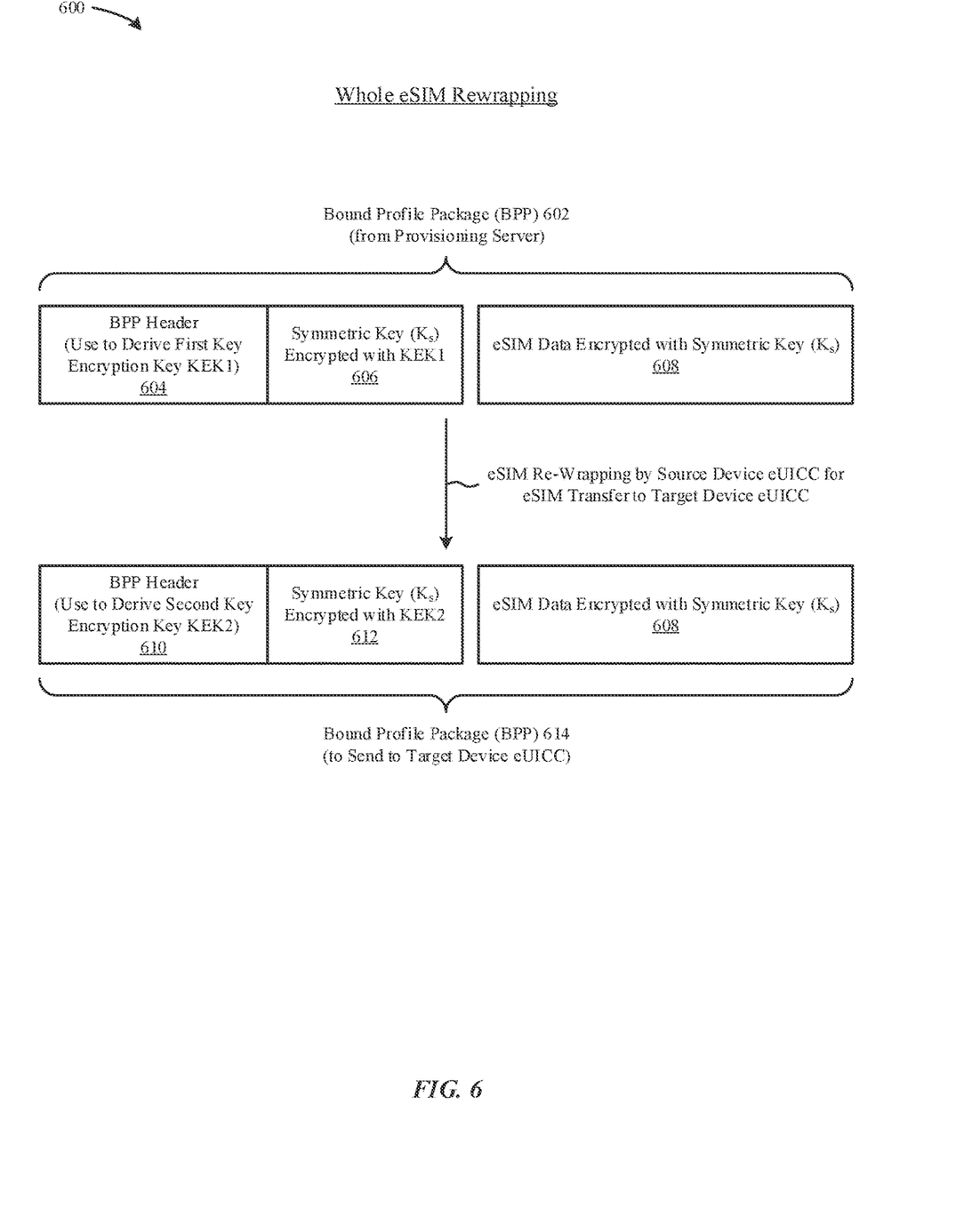
FIG. 6 illustrates an example of whole eSIM rewrapping to generate a bound profile package for transfer of an eSIM, according to some embodiments.

FIG. 6 illustrates a diagram 600 of an example of whole eSIM rewrapping to generate a new bound profile package (BPP) for transfer of an eSIM 208 from a source device eUICC 108-1 to a target device eUICC 108-2. A BPP 602, received previously by the source device eUICC 108-1 from a provisioning server 116 and stored by the source device eUICC 108-1, includes a BPP header 604, which includes information from which the source device eUICC 108-1 can derive a first key encryption key KEK1, and a symmetric key $K_s$ 606 encrypted with KEK1. The BPP header 604 and encrypted symmetric key $K_s$ 606 is bundled with eSIM data 608 encrypted with the symmetric key $K_s$. Upon installation of the eSIM 208 obtained from the BPP 602, the source device eUICC 108-1 can store the first key encryption key KEK1 securely within a dedicated security domain of the source device eUICC 108-1, e.g., within a profile issuer security domain (ISD-P) associated with the installed eSIM 208. For transfer (export) of the eSIM 208 to another mobile wireless device 102, e.g., to a target device eUICC 108-2, the source device eUICC 108-1 can establish an eSIM transfer session with the target device eUICC 108-2 and exchange ephemeral keys, e.g., ePK$_{source}$ and ePK$_{target}$ as described with regards to the flow chart illustrated in FIG. 5. The source device eUICC 108-1 can generate a second key encryption key KEK2, e.g., using an ECDH KDF function KEK2=KDF(ECDH(ePK$_{target}$, eSK$_{source}$)), and re-encrypt the symmetric key $K_s$ (decrypted with KEK1) using KEK2. The source device eUICC 108-1 can then generate a new header 610 including information with which the target device eUICC 108-2 can derive the second key encryption key KEK2. The new header 610 and the re-encrypted symmetric key $K_s$ 612 can be bundled with the symmetric key $K_s$ encrypted eSIM data 608 to form a new BPP 614 to transfer the eSIM to the target device eUICC 108-2. The target device eUICC 108-2 can derive the same second key encryption key KEK2 using information from the BPP header 610, e.g., using the ECDH KDF function KEK2=KDF(ECDH(eSK$_{target}$, ePK$_{source}$)). Because the $K_s$ encrypted eSIM data 608 remains encrypted (and thus secure) while stored by the source device eUICC 108-1, the eSIM data 608 can be stored on the source device eUICC 108-1 outside of the dedicated security domain (e.g., outside of ISD-P associated with the eSIM 208, such as in a root issuer security domain ISD-R) or external to the source device eUICC 108-1 (on memory of the mobile wireless device 102) depending on storage requirements for the encrypted eSIM data 608 and on availability of non-volatile random access memory (NVRAM) storage on the source device eUICC 108-1. If stored external to source device eUICC 108-1, a device/eUICC command can be used to reload the encrypted eSIM data 608 to the source device eUICC 108-1 to process for rewrapping on the source device eUICC 108-1 and for subsequent transfer of the eSIM 208 to the target device eUICC 108-2. The rewrapped BPP 614 can be sent securely by the source device eUICC 108-1 to the target device eUICC 108-2 for installation on the target device eUICC 108-2.

Figure 7:
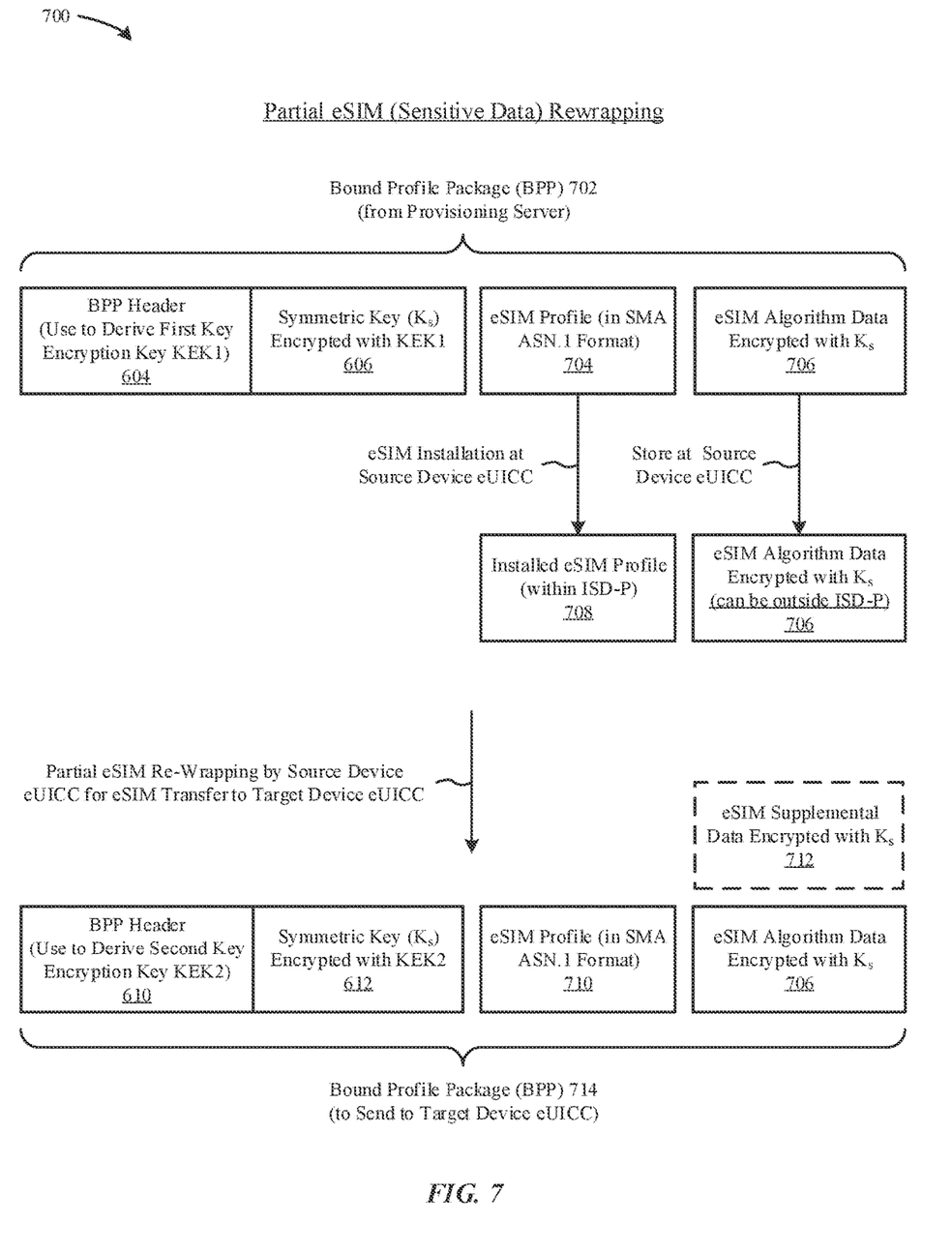
FIG. 7 illustrates an example of partial eSIM rewrapping of sensitive data to generate a bound profile package for transfer of an eSIM, according to some embodiments.

FIG. 7 illustrates a diagram 700 of an example of partial eSIM (sensitive data) rewrapping to generate a new bound profile package (BPP) 714 for transfer of an eSIM 208 from a source device eUICC 108-1 to a target device eUICC 108-2. A BPP 702, received previously from a provisioning server 116 by the source device eUICC 108-1, can include a BPP header 604 with information to derive a first key encryption key KEK1 and a symmetric key $K_s$ 606 encrypted with KEK1. The BPP 702 can also include eSIM data divided into two (as shown) or more (not shown) portions, such as an eSIM profile 704 in a SIMalliance (SMA) Abstract Syntax Notation One (ASN.1) format, and separate eSIM algorithm data 706 encrypted with the symmetric key $K_s$. In some embodiments, the BPP 702 includes multiple distinct eSIM data portions, each encrypted with the same symmetric key $K_s$ or with distinct symmetric keys. The eSIM profile 704 (along with sensitive data extracted from a decrypted version of the eSIM algorithm data 706) can be installed on the source device eUICC 108-1 within a dedicated security domain for the eSIM 208, e.g., within an ISD-P, while the $K_s$ encrypted eSIM algorithm data 706 can be stored at the source device eUICC 108-1 (e.g., inside or outside the ISD-P containing the installed eSIM 208, e.g., in a root issuer security domain ISD-R) or in some embodiments on a memory of the mobile wireless device 102 external to the source device eUICC 108-1. Upon installation of the eSIM 208 from the BPP 602, the source device eUICC 108-1 can also store the first key encryption key KEK1 securely within the dedicated security domain of the source device eUICC 108-1, e.g., within the ISD-P associated with the installed eSIM 208, to use for later transfer of the eSIM 208 to another mobile wireless device 102. For transfer (export) of the eSIM 208 to another mobile wireless device 102, e.g., to a target device eUICC 108-2, the source device eUICC 108-1 can establish an eSIM transfer session with the target device eUICC 108-2, exchange ephemeral keys, derive a second key encryption key KEK2, re-encrypt the symmetric key $K_s$ with KEK2, and generate the new BPP header 610 as described previously for FIGS. 5 and 6. With partial eSIM rewrapping, however, an up-to-date eSIM profile 710 in an SMA ASN.1 format can be generated by the source device eUICC 108-1 based on the installed eSIM profile 708, which can include over-the-air (OTA) updates from an MNO 114 associated with the eSIM 208 and/or user customizations that occurred after initial installation of the eSIM profile 708. The source device eUICC 108-1 can combine the newly generated eSIM profile 710 with the previously stored $K_s$ encrypted eSIM algorithm data 706 and append the BPP header 610 (with information for derivation of KEK2) and the KEK2 encrypted symmetric key $K_s$ to form a new BPP 714 to send to the target device eUICC 108-2 to transfer the eSIM 208. In some embodiments, additional sensitive data associated with the eSIM 208 can be encrypted with the symmetric key $K_s$ (or with another encryption key that is known or provided directly/indirectly to the target device eUICC 108-2) and formatted into $K_s$ encrypted eSIM supplemental data 712 for transfer within the BPP 714 from the source device eUICC 108-1 to the target device eUICC 108-2. In some embodiments, the $K_s$ encrypted eSIM supplemental data 712 includes information for updating eSIM sensitive data in the $K_s$ encrypted eSIM algorithm data 706. In some embodiments, the $K_s$ encrypted eSIM supplemental data 712 includes sensitive data for applets associated with the eSIM 208. For example, some applets 212 of the eSIM 208 can store sensitive data that requires encryption protection for transfer between the source device eUICC 108-1 and the target device eUICC 108-2, such as financial transaction information, credit/debit card data, transit authority credentials, etc. In some embodiments, an owner of the eSIM 208, e.g., an MNO 114 associated with the eSIM 208, can designate which information to protect for transfer and therefore can be included in the $K_s$ encrypted eSIM supplemental data 712. In some embodiments, an indication of which information to protect can be included in and/or accompany the $K_s$ encrypted eSIM algorithm data 706 and $K_s$ encrypted eSIM supplemental data 712 received from the provisioning server 116.

Figure 8:
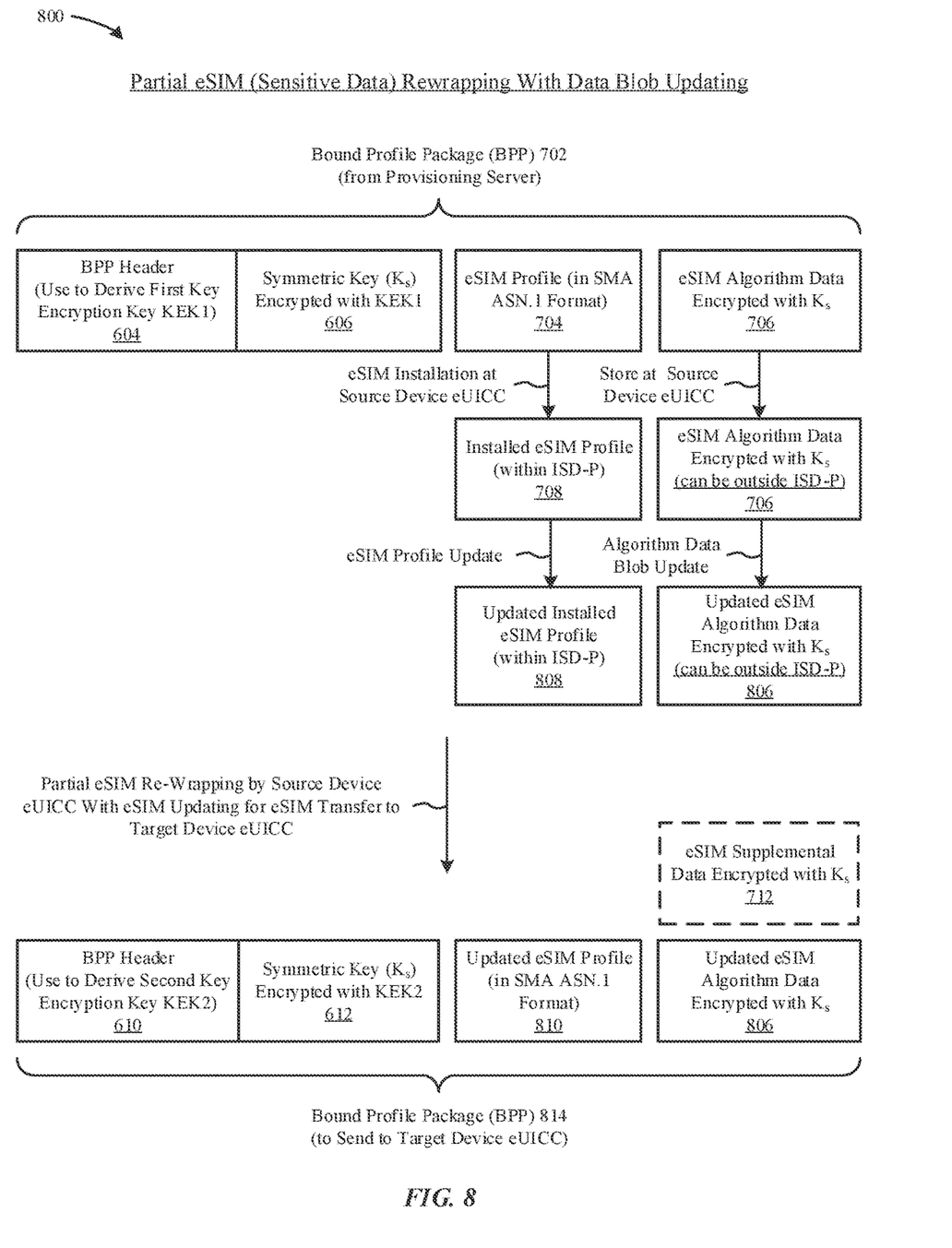
FIG. 8 illustrates an example of partial eSIM rewrapping of sensitive data with data updating to generate a bound profile package for transfer of an eSIM, according to some embodiments.

FIG. 8 illustrates a diagram 800 of an example of partial eSIM rewrapping of sensitive data with data updating to generate a new bound profile package (BPP) 814 for transfer of an eSIM 208. A BPP 702, received previously from a provisioning server 116 by the source device eUICC 108-1, can include a BPP header 604 with information to derive a first key encryption key KEK1 and a symmetric key $K_s$ 606 encrypted with KEK1. The BPP 702 can also include eSIM data divided into two (as shown) or more (not shown) portions, such as an eSIM profile 704 in a SIMalliance (SMA) Abstract Syntax Notation One (ASN.1) format, and separate eSIM algorithm data 706 encrypted with the symmetric key $K_s$. In some embodiments, the BPP 702 includes multiple distinct eSIM data portions, each encrypted with the same symmetric key $K_s$ or with distinct symmetric keys. The eSIM profile 704 (along with sensitive data extracted from a decrypted version of the $K_s$ encrypted eSIM algorithm data 706) can be installed on the source device eUICC 108-1 within a dedicated security domain for the eSIM 208, e.g., within an ISD-P, while the $K_s$ encrypted eSIM algorithm data 706 can be stored at the source device eUICC 108-1 (e.g., inside or outside the ISD-P containing the installed eSIM 208, e.g., in a root issuer security domain ISD-R) or in some embodiments on a memory of the mobile wireless device 102 external to the source device eUICC 108-1. Upon installation of the eSIM 208 from the BPP 602, the source device eUICC 108-1 can also store the first key encryption key KEK1 securely within the dedicated security domain of the source device eUICC 108-1, e.g., within the ISD-P associated with the installed eSIM 208, to use for later transfer of the eSIM 208 to another mobile wireless device 102. In some embodiments, the installed eSIM profile 708 can be updated, e.g., based on MNO OTA updates and/or user customizations, to produce an updated installed eSIM profile 808. In some embodiments, the $K_s$ encrypted eSIM algorithm data 706 can be updated (within a secure protected environment of the source device eUICC 108-1, such as in the ISD-P) and re-encrypted with $K_s$ and stored as $K_s$ encrypted updated algorithm data 806 (which can be stored inside or outside the ISD-P). Updating of the eSIM profile and the eSIM algorithm data can occur independently, e.g., one or both may be updated prior to re-wrapping for transfer of the eSIM 208 to the target device eUICC 108-2. In some embodiments, the BPP 702 includes multiple encrypted data portions, each which can be updated separately. In some embodiments, the source device eUICC 108-1 forms eSIM supplemental data 712 encrypted with $K_s$ (or another key) to include with the BPP 714 for transfer of the eSIM 208 to the target device eUICC 108-2. The $K_s$ encrypted eSIM supplemental data 712 can be based on additional eSIM data included with the original BPP 702 (not shown) or based on additional information provided to the source device eUICC 108-1 after initial installation of the eSIM 208. The $K_s$ encrypted eSIM supplemental data 712 can include sensitive data information for one or more applets of the eSIM 208, such as financial transaction data, credit/debit card data, transit authority credentials, or the like. The source device eUICC 108-1 forms the new BPP 814 to include the updated eSIM profile 810 (e.g., in SIMalliance ASN.1 format), the $K_s$ encrypted updated eSIM algorithm data 806, the BPP header 610, the KEK2 encrypted symmetric key $K_s$ 612, and optionally the $K_s$ encrypted eSIM supplemental data 712. The new BPP 814 can be sent by the source device eUICC 108-1 to the target device eUICC 108-2 to transfer the eSIM 208 for subsequent installation on the target device eUICC 108-2.

Representative Embodiments

A source device 102-1 can be configured for transfer of an eSIM profile 208 with credential rewrapping to a target device 102-2. The source device 102-1 can include at least: one or more antennas, a storage element, an eUICC 108-1, and at least one processor 104 communicatively coupled to a memory storing instructions that when executed by the at least one processor cause the eUICC 108-1 of the source device 102-1 to perform actions including: i) obtaining, from the storage element and previously extracted from a bound profile package (BPP) 602 (or 702), a) an encrypted symmetric key ($K_s$) 606 encrypted with a first key encryption key (KEK1), and b) $K_s$ encrypted eSIM data 608 (or 706); ii) establishing an eSIM transfer session with an eUICC 108-2 of the target device 102-2; iii) deriving an ephemeral key pair ($ePK_{source}$, $eSK_{source}$) for transfer of the eSIM profile 208; iv) exchanging ephemeral public keys ($ePK_{source}$, $ePK_{target}$) with the eUICC 108-2 of the target device 102-2; v) deriving a second key encryption key (KEK2) based on the target device 102-2 ephemeral public key $ePK_{target}$ and the source device 102-1 private key $eSK_{source}$; vi) decrypting the encrypted symmetric key $K_s$ with KEK1 and generating a re-encrypted symmetric key $K_s$ by re-encrypting $K_s$ with KEK2; vii) formatting a new BPP 614 (or 714 or 814) based at least in part on: a) the $K_s$ encrypted eSIM data 608 (or 706), and b) the re-encrypted symmetric key $K_s$ 612; and viii) sending the new BPP 614 (or 714 or 814) to the target device 102-2 to transfer the eSIM profile 208 from the eUICC 108-1 of the source device 102-1 to the eUICC 108-2 of the target device 120-2.

In some embodiments, the actions performed by the eUICC 108-1 of the source device 102-1 further include: receiving the BPP 602 (or 702) from a provisioning server 116; extracting the encrypted symmetric key $K_s$ 606 and the $K_s$ encrypted eSIM data 608 (or 706); and storing the encrypted symmetric key $K_s$ 606 and the $K_s$ encrypted eSIM data 608 (or 706) in the storage element. In some embodiment, the BPP 602 (or 702) received from the provisioning server 116 includes information in a header 604 of the BPP 602 (or 702) with which to derive KEK1. In some embodiments, the BPP 702 received from the provisioning server 116 includes: i) the eSIM profile 704 in a SIMalliance (SMA) Abstract Syntax Notation One (ASN.1) format, and ii) the $K_s$ encrypted eSIM data includes $K_s$ encrypted eSIM algorithm data 706. In some embodiments, the new BPP 614 (or 714 or 814) provided to the eUICC 108-2 of the target device 102-2 includes information in a header 610 of the new BPP 614 (or 714 or 814) with which to derive KEK2. In some embodiments, the new BPP 714 (or 814) provided to the eUICC 108-2 of the target device 102-2 includes the eSIM profile 710 (or 810) in the SIMalliance (SMA) Abstract Syntax Notation One (ASN.1) format. In some embodiments, the actions performed by the eUICC 108-1 of the source device 102-1 further include generating the eSIM profile 710 (or 810) to include in the new BPP 714 (or 814) based at least in part on an installed eSIM profile 708 (or 808) on the eUICC 108-1 of the source device 102-1. In some embodiments, the installed eSIM profile 808 includes one or more over-the-air (OTA) updates received from a mobile network operator (MNO) 114 associated with the eSIM profile 208 (or 808). In some embodiments, the installed eSIM profile 708 (or 808) includes one or more user customizations applied after initial installation on the eUICC 108-1 of the source device 102-1 of an initial eSIM profile 704 extracted from the BPP 714 (or 814). In some embodiments, the new BPP 714 (or 814) includes $K_s$ encrypted eSIM algorithm data 706 (or 806). In some embodiments, the new BPP 714 (or 814) further includes eSIM supplemental data 712 encrypted with $K_s$ or with a second encryption key known to or provided to the eUICC 108-2 of the target device 102-2. In some embodiments, the eSIM supplemental data 712 includes information for updating sensitive data in the eSIM algorithm data 706 (or 806). In some embodiments, the eSIM supplemental data 712 further includes sensitive data for one or more applets 212 associated with the eSIM profile 208 (or 808).

In some embodiments, an eUICC 108-1 is configured for eSIM profile 208 transfer with credential rewrapping from a source device 102-1 to a target device 102-2 and includes at least one processor communicatively coupled to a memory storing instructions that when executed by the at least one processor cause the eUICC 108-1 of the source device 102-1 to perform actions as described herein.

In some embodiments, an eUICC 108-2 is configured for eSIM profile 208 transfer with credential rewrapping from a source device 102-1 to a target device 102-2 and includes at least one processor communicatively coupled to a memory storing instructions that when executed by the at least one processor cause the eUICC 108-2 of the target device 102-2 to perform actions as described herein.

In some embodiments, a method for eSIM profile 208 transfer with credential rewrapping from a source device 102-1 to a target device 102-2 includes an eUICC 108-1 of the source device 102-1: i) obtaining, from the storage element and previously extracted from a bound profile package (BPP) 602 (or 702), a) an encrypted symmetric key ($K_s$) 606 encrypted with a first key encryption key (KEK1), and b) $K_s$ encrypted eSIM data 608 (or 706); ii) establishing an eSIM transfer session with an eUICC 108-2 of the target device 102-2; iii) deriving an ephemeral key pair (ePK$_{source}$, eSK$_{source}$) for transfer of the eSIM profile 208; iv) exchanging ephemeral public keys (ePK$_{source}$, ePK$_{target}$) with the eUICC 108-2 of the target device 102-2; v) deriving a second key encryption key (KEK2) based on the target device 102-2 ephemeral public key ePK$_{target}$ and the source device 102-1 private key eSK$_{source}$; vi) decrypting the encrypted symmetric key $K_s$ with KEK1 and generating a re-encrypted symmetric key $K_s$ by re-encrypting $K_s$ with KEK2; vii) formatting a new BPP 614 (or 714 or 814) based at least in part on: a) the $K_s$ encrypted eSIM data 608 (or 706), and b) the re-encrypted symmetric key $K_s$ 612; and viii) sending the new BPP 614 (or 714 or 814) to the target device 102-2 to transfer the eSIM profile 208 from the eUICC 108-1 of the source device 102-1 to the eUICC 108-2 of the target device 120-2.

Representative Exemplary Apparatus

Figure 9:
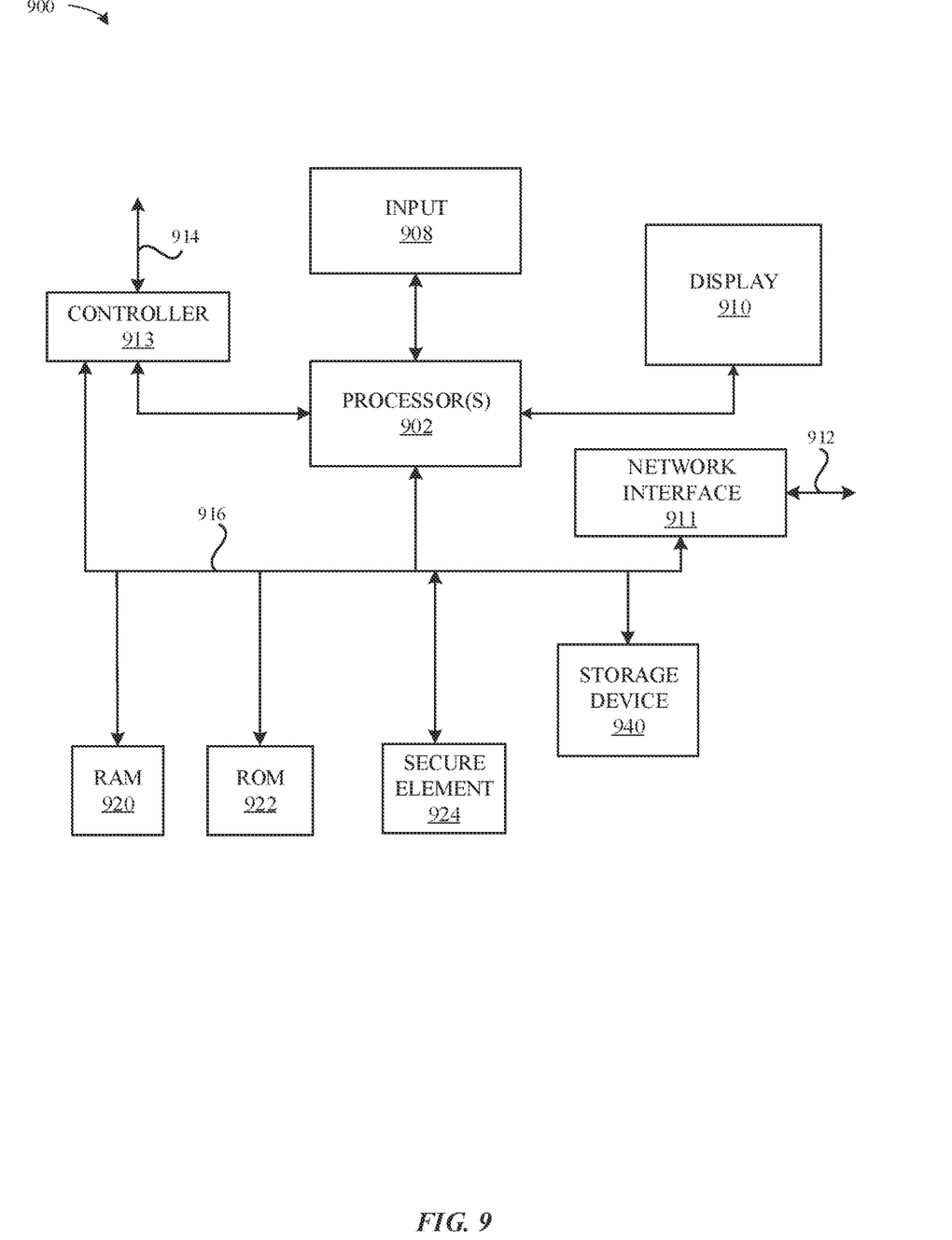
FIG. 9 illustrates a block diagram of exemplary elements of a mobile wireless device, according to some embodiments.

FIG. 9 illustrates in block diagram format an exemplary computing device 900 that can be used to implement the various components and techniques described herein, according to some embodiments. In particular, the detailed view of the exemplary computing device 900 illustrates various components that can be included in the source device 102-1 and/or the target device 102-2. As shown in FIG. 9, the computing device 900 can include one or more processors 902 that represent microprocessors or controllers for controlling the overall operation of computing device 900. In some embodiments, the computing device 900 can also include a user input device 908 that allows a user of the computing device 900 to interact with the computing device 900. For example, in some embodiments, the user input device 908 can take a variety of forms, such as a button, keypad, dial, touch screen, audio input interface, visual/image capture input interface, input in the form of sensor data, etc. In some embodiments, the computing device 900 can include a display 910 (screen display) that can be controlled by the processor(s) 902 to display information to the user (for example, information relating to incoming, outgoing, or active communication sessions). A data bus 916 can facilitate data transfer between at least a storage device 940, the processor(s) 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include wireless circuitry, such as a wireless transceiver and/or baseband processor. The computing device 900 can also include a secure element 924. The secure element 924 can include an eUICC 108.

The computing device 900 also includes a storage device 940, which can include a single storage or a plurality of storages (e.g., hard drives), and includes a storage management module that manages one or more partitions within the storage device 940. In some embodiments, storage device 940 can include flash memory, semiconductor (solid state) memory or the like. The computing device 900 can also include a Random-Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A target device configured for transfer of an electronic subscriber identity module (eSIM) profile from a source device, the target device comprising:
   one or more antennas;
   a storage element;
   an embedded universal integrated circuitry card (eUICC); and
   at least one processor communicatively coupled to a memory storing instructions that when executed by the at least one processor cause the eUICC of the target device to:
   establish an eSIM transfer session with an eUICC of the source device;
   derive an ephemeral key pair ($ePK_{target}$, $eSK_{target}$) for transfer of the eSIM profile, wherein $ePK_{target}$ comprises a target device public key and $eSK_{target}$ comprises a target device private key;
   exchange ephemeral public keys ($ePK_{target}$, $ePK_{source}$) with the eUICC of the source device, wherein $ePK_{source}$ comprises a source device public key;
   receive, from the eUICC of the source device, a new bound profile package (BPP) generated by the eUICC of the source device, the new BPP including: i) an encrypted symmetric key $K_s$, and ii) $K_s$ encrypted eSIM data;
   derive a second key encryption key (KEK2) based on the source device ephemeral public key $ePK_{source}$ and the target device private key $eSK_{target}$;
   decrypt the encrypted symmetric key $K_s$ with KEK2;
   decrypt the $K_s$ encrypted eSIM data with the decrypted symmetric key $K_s$ to obtain decrypted eSIM data;
   install, on the eUICC, the eSIM profile using the decrypted eSIM data; and store, on the eUICC of the target device, KEK2 and the new BPP received from the eUICC of the source device.

2. The target device of claim 1, wherein the eUICC of the source device generates the new BPP based on a BPP previously received from a provisioning server and encrypted with a first key encryption key (KEK1).

3. The target device of claim 1, wherein the new BPP received from the eUICC of the source device includes information in a header of the new BPP with which to derive KEK2.

4. The target device of claim 1, wherein the new BPP received from the eUICC of the source device includes the eSIM profile in a SIMalliance (SMA) Abstract Syntax Notation One (ASN.1) format.

5. The target device of claim 1, wherein the eSIM profile included in the new BPP received from the eUICC of the source device is based at least in part on an installed eSIM profile on the eUICC of the source device.

6. The target device of claim 5, wherein the installed eSIM profile includes one or more over-the-air (OTA) updates received from a mobile network operator (MNO) associated with the eSIM profile.

7. The target device of claim 5, wherein the installed eSIM profile includes one or more user customizations applied after initial installation on the eUICC of the source device of an initial eSIM profile extracted from a BPP previously received by the eUICC of the source device from a provisioning server.

8. The target device of claim 1, wherein the new BPP includes $K_s$ encrypted eSIM algorithm data.

9. The target device of claim 8, wherein:
the new BPP further includes eSIM supplemental data encrypted with $K_s$ or with a second encryption key known to or provided to the eUICC of the target device, and
the eSIM supplemental data includes information for updating sensitive data in the eSIM algorithm data.

10. The target device of claim 9, wherein the eSIM supplemental data further includes sensitive data for one or more applets associated with the eSIM profile.

11. An embedded universal integrated circuit card (eUICC) of a target device configured for electronic subscriber identity module (eSIM) profile transferal, the eUICC of the target device comprising:
at least one processor communicatively coupled to a memory storing instructions that when executed by the at least one processor cause the eUICC of the target device to:
establish an eSIM transfer session with an eUICC of a source device;
derive an ephemeral key pair ($ePK_{target}$, $eSK_{target}$) for transfer of the eSIM profile, wherein $ePK_{target}$ comprises a target device public key and $eSK_{target}$ comprises a target device private key;
exchange ephemeral public keys ($ePK_{target}$, $ePK_{source}$) with the eUICC of the source device, wherein $ePK_{source}$ comprises a source device public key;
receive, from the eUICC of the source device, a new bound profile package (BPP) generated by the eUICC of the source device, the new BPP including:
i) an encrypted symmetric key $K_s$, and ii) $K_s$ encrypted eSIM data;
derive a second key encryption key (KEK2) based on the source device public key $ePK_{source}$ and the target device private key $eSK_{target}$;
decrypt the encrypted symmetric key $K_s$ with KEK2;
decrypt the $K_s$ encrypted eSIM data with the decrypted symmetric key $K_s$ to obtain decrypted eSIM data;
install, on the eUICC, the eSIM profile using the decrypted eSIM data; and
store, on the eUICC of the target device, KEK2 and the new BPP received from the eUICC of the source device.

12. The eUICC of claim 11, wherein the new BPP received from the eUICC of the source device includes information in a header of the new BPP with which to derive KEK2.

13. The eUICC of claim 11, wherein the new BPP received from the eUICC of the source device includes the eSIM profile in a SIMalliance (SMA) Abstract Syntax Notation One (ASN.1) format.

14. The eUICC of claim 11, wherein the eSIM profile included in the new BPP received from the eUICC of the source device is based at least in part on an installed eSIM profile on the eUICC of the source device.

15. The eUICC of claim 14, wherein the installed eSIM profile includes one or more over-the-air (OTA) updates received from a mobile network operator (MNO) associated with the eSIM profile.

16. The eUICC of claim 14, wherein the installed eSIM profile includes one or more user customizations applied after initial installation on the eUICC of the source device of an initial eSIM profile extracted from a BPP previously received by the eUICC of the source device from a provisioning server.

17. The eUICC of claim 11, wherein the new BPP includes $K_s$ encrypted eSIM algorithm data.

18. The eUICC of claim 17, wherein:
the new BPP further includes eSIM supplemental data encrypted with $K_s$ or with a second encryption key known to or provided to the eUICC of the target device, and
the eSIM supplemental data includes information for updating sensitive data in the eSIM algorithm data.

19. The eUICC of claim 18, wherein the eSIM supplemental data further includes sensitive data for one or more applets associated with the eSIM profile.

20. A method for electronic subscriber identity module (eSIM) profile transfer with credential rewrapping from a source device to a target device, the method comprising:
at an embedded universal integrated circuitry card (eUICC) of the target device:
establishing an eSIM transfer session with an eUICC of the source device;
deriving an ephemeral key pair ($ePK_{target}$, $eSK_{target}$) for transfer of the eSIM profile, wherein $ePK_{target}$ comprises a target device public key and $eSK_{target}$ comprises a target device private key;
exchanging ephemeral public keys ($ePK_{target}$, $ePK_{source}$) with the eUICC of the source device, wherein $ePK_{source}$ comprises a source device public key;
receiving, from the eUICC of the source device, a new bound profile package (BPP) generated by the eUICC of the source device, the new BPP including:
i) an encrypted symmetric key $K_s$, and ii) $K_s$ encrypted eSIM data;
deriving a second key encryption key (KEK2) based on the source device public key $ePK_{source}$ and the target device private key $eSK_{target}$;
decrypting the encrypted symmetric key $K_s$ with KEK2;

decrypting the $K_s$ encrypted eSIM data with the decrypted symmetric key $K_s$ to obtain decrypted eSIM data;

installing, on the eUICC, the eSIM profile using the decrypted eSIM data; and storing, on the eUICC of the target device, KEK2 and the new BPP received from the eUICC of the source device.

\* \* \* \* \*

UNITED STATES PATENT AND TRADEMARK OFFICE
CERTIFICATE OF CORRECTION

PATENT NO. : 11,736,273 B2
APPLICATION NO. : 17/820236
DATED : August 22, 2023
INVENTOR(S) : Xiangying Yang et al.

Page 1 of 1

It is certified that error appears in the above-identified patent and that said Letters Patent is hereby corrected as shown below:

In the Claims

In Claim 1, at Column 14, Line 40: "an embedded universal integrated circuitry card (eUICC);" should read -- an embedded universal integrated circuit card (eUICC); --.

In Claim 1, at Column 14, Line 61: "the source ephemeral device public key $ePK_{source}$" should read -- the source device public key $ePK_{source}$ --.

In Claim 20, at Column 16, Line 46: "at an embedded universal integrated circuitry card" should read -- at an embedded universal integrated circuit card --.

Signed and Sealed this
Twenty-sixth Day of December, 2023

Katherine Kelly Vidal
*Director of the United States Patent and Trademark Office*